United States Patent
Dulin

(10) Patent No.: US 9,482,357 B2
(45) Date of Patent: Nov. 1, 2016

(54) TEMPERATURE CONTROLLED PURGE VALVE FOR USE IN WATER SYSTEMS

(71) Applicant: Baker Products Limited, Kingsbury, TX (US)

(72) Inventor: Robert Dulin, Kingsbury, TX (US)

(73) Assignee: Baker Products Ltd., Kingsbury, TX (US)

( * ) Notice: Subject to any disclaimer, the term of this patent is extended or adjusted under 35 U.S.C. 154(b) by 367 days.

(21) Appl. No.: 14/065,857

(22) Filed: Oct. 29, 2013

(65) Prior Publication Data

US 2014/0352812 A1    Dec. 4, 2014

Related U.S. Application Data

(60) Provisional application No. 61/828,474, filed on May 29, 2013.

(51) Int. Cl.
*F16K 31/00*    (2006.01)

(52) U.S. Cl.
CPC ........ *F16K 31/002* (2013.01); *Y10T 137/1189* (2015.04); *Y10T 137/1353* (2015.04); *Y10T 137/1963* (2015.04); *Y10T 137/5497* (2015.04); *Y10T 137/7737* (2015.04)

(58) Field of Classification Search
CPC ............. F16K 31/002; Y10T 137/002; Y10T 137/1189; Y10T 137/1353; Y10T 137/1963; Y10T 137/5497; Y10T 137/7737
USPC ....................................................... 251/364
See application file for complete search history.

(56) References Cited

U.S. PATENT DOCUMENTS

| | | | |
|---|---|---|---|
| 2,146,983 A * | 2/1939 | Pick ........................ | C02F 1/42 137/246 |
| 3,351,350 A | 11/1967 | Towson | |
| 3,369,556 A | 2/1968 | Allderdice | |
| 3,380,464 A | 4/1968 | Arterbury et al. | |
| 3,397,711 A | 8/1968 | Strange | |
| 3,446,226 A | 5/1969 | Canterbuy | |
| 3,618,625 A * | 11/1971 | Walters ................. | A01K 7/025 119/73 |

(Continued)

FOREIGN PATENT DOCUMENTS

| | | | | |
|---|---|---|---|---|
| DE | WO 0006931 A1 * | 2/2000 | ........... | F16K 31/002 |
| WO | 2010016816 | 2/2010 | | |
| WO | 2011133166 | 10/2011 | | |

OTHER PUBLICATIONS

Machine Translation of WO0006931, Specification Only, Dated Jul. 29, 1998, pp. 1-4.*

*Primary Examiner* — Craig Schneider
*Assistant Examiner* — Frederick D Soski
(74) *Attorney, Agent, or Firm* — Jackson Walker, LLP

(57) ABSTRACT

Applicant discloses a thermally actuated valve having a housing, a resilient seat, a thermally conductive piston, a spring fluid seal, and a working material. The housing defines an inlet and an outlet and has two chambers. The seat is adjacent the inlet and the piston is adapted to move towards the seat when a working fluid in the housing warms and expands and away from the seat when a working fluid in the housing cools. By moving away from the seat, fluid flow through the valve is generated. In one application, Applicant's valve acts as a freeze prevention device. In another application, Applicant's valve is used to cool a source of water.

19 Claims, 9 Drawing Sheets

(56) References Cited

U.S. PATENT DOCUMENTS

| | | | | |
|---|---|---|---|---|
| 3,688,582 A | * | 9/1972 | Gradishar | G01K 13/002 374/105 |
| 3,765,647 A | * | 10/1973 | Grove | F16K 3/0227 251/317 |
| 3,951,419 A | | 4/1976 | Abrahams et al. | |
| 4,205,698 A | * | 6/1980 | Hucks | E03B 7/12 137/62 |
| 4,296,770 A | * | 10/1981 | Rice | G05D 23/023 137/62 |
| 4,356,833 A | * | 11/1982 | Mayfield, Jr. | F16L 55/00 137/62 |
| 4,453,698 A | | 6/1984 | DeFrees | |
| 4,456,024 A | * | 6/1984 | Roberts | E03B 7/12 137/62 |
| 4,460,007 A | * | 7/1984 | Pirkle | F16K 17/38 137/62 |
| 4,484,594 A | * | 11/1984 | Alderman | E03B 7/12 137/62 |
| 4,664,185 A | * | 5/1987 | Barnard | E03B 3/12 137/301 |
| 4,784,173 A | | 11/1988 | Carney | |
| 4,848,389 A | * | 7/1989 | Pirkle | E03B 7/10 137/357 |
| 5,692,535 A | * | 12/1997 | Walters | E03B 7/10 137/62 |
| 6,374,849 B1 | | 4/2002 | Howell | |
| 6,530,391 B1 | | 3/2003 | Dulin | |
| 6,644,345 B2 | | 11/2003 | Dulin | |
| 6,772,958 B1 | * | 8/2004 | Lamb | F01P 7/16 236/100 |
| 6,892,747 B2 | | 5/2005 | Dulin | |
| 7,055,593 B2 | | 6/2006 | Lappin | |
| 7,168,450 B2 | | 1/2007 | Dulin | |
| 8,490,885 B2 | | 7/2013 | Lamb et al. | |
| 2001/0010210 A1 | * | 8/2001 | Chamot | F01P 7/167 123/41.1 |
| 2004/0164496 A1 | | 8/2004 | Okada et al. | |
| 2006/0249590 A1 | | 11/2006 | Dulin | |
| 2006/0249914 A1 | * | 11/2006 | Dulin | F16J 15/002 277/512 |
| 2010/0032594 A1 | | 2/2010 | Lamb et al. | |
| 2010/0108152 A1 | * | 5/2010 | Caleffi | E03B 7/12 137/79 |
| 2012/0112114 A1 | * | 5/2012 | Kim | E03B 7/10 251/324 |

* cited by examiner

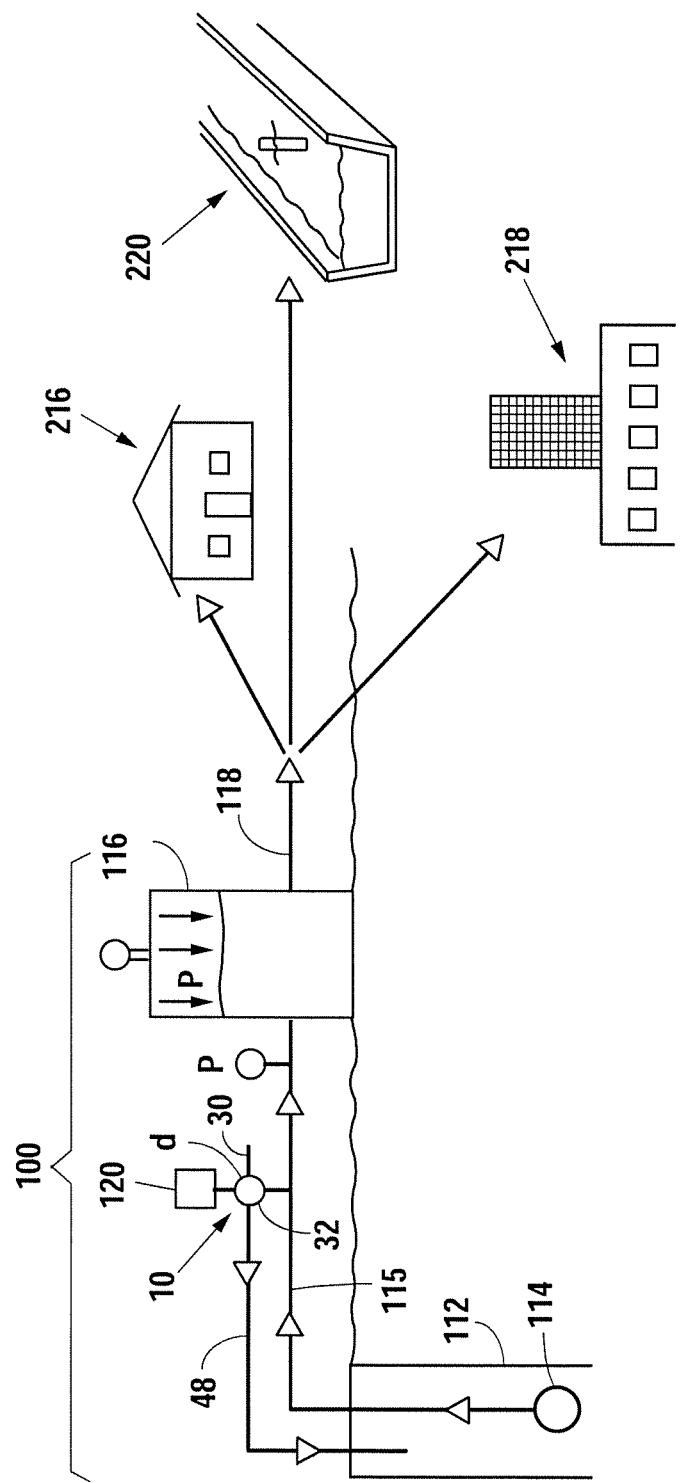

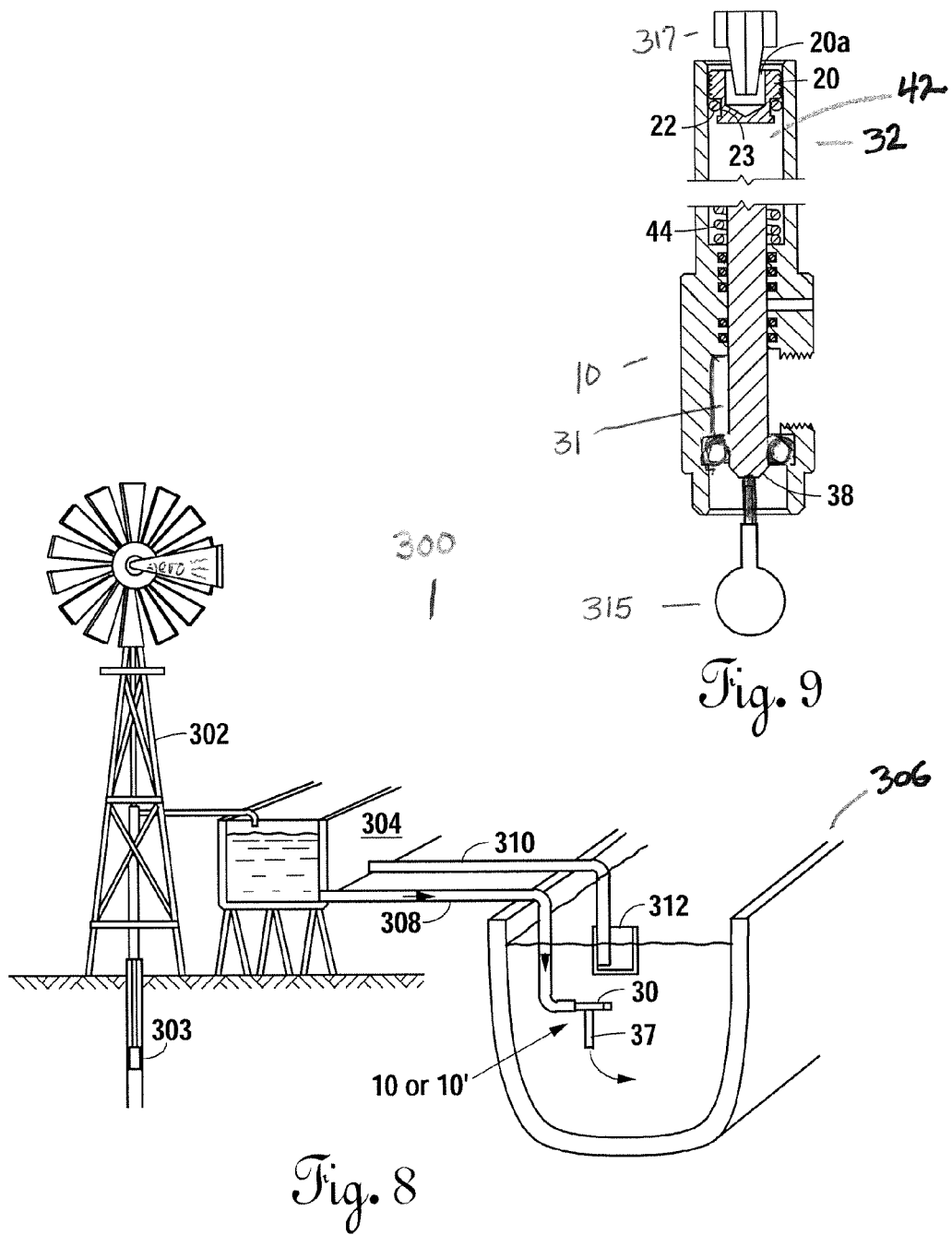

US 9,482,357 B2

TEMPERATURE CONTROLLED PURGE VALVE FOR USE IN WATER SYSTEMS

RELATED APPLICATIONS

This application claims priority to, the benefit of, and incorporates by reference, U.S. Provisional Patent Application No. 61/828,474, filed May 13, 2013.

FIELD OF THE INVENTION

Temperature controlled valve for water systems, including water well and water softener freeze protection, as well as other system water flow control.

BACKGROUND OF THE INVENTION

Water well and water softener systems use pressurized water in pipes or other elements that are sometimes exposed to cold temperatures. Freeze protection in the past has typically utilized wrapping exposed elements with electrical heat tape or insulation or a combination of both methods. While these solutions are often satisfactory for most conditions, there exists a need for a non-electrical, non-passive system that engages pressurized elements of water supply assemblies for actively preventing freeze-up by temperature, with the use of the pressurized systems water, to purge the chilled water and subsequently, and as a direct result of purging, replace with warmer water. This action prevents the devices from freezing. There is also the need for flow control in water systems wherein water cooler than ambient is needed downstream of a water supply.

SUMMARY OF THE INVENTION

A water carrying pressure bearing system comprising a source of water pressure is provided. Water bearing lines or water bearing containers are sometimes exposed to external air temperature fluctuations or ambient water conditions. Downstream of the source of water, freeze protection is provided. Protected system elements are in fluid communication with a water bearing line and the source of water pressure. In the water bearing line, there is a working fluid containing a phase change activated purge valve, the working fluid typically having a freezing point above 32° F., the valve in fluid communication with the water bearing line. In one embodiment, the valve is biased to a normally closed position at temperatures above the freezing point of the working fluid. The valve opens as the working fluid contracts and freezes. The working fluid may be, in one embodiment, selected from fluids with freezing points being in the range of about 32° F. to about 50° F. or preferably about 34° F. to 45° F. The valve may have an outlet engaged therewith to carry away water received therein when the valve opens responsive to cooling air on an air sensing portion. The valve may be moderated by a water temperature sensing side. The protected elements, in three embodiments, comprise a water softener controller valve, a water trough, and a pressure switch for any number of uses or systems.

In a first embodiment of several, Applicant provides an active, non-electrical, air and water temperature responsive purge valve downstream of a well water pump and upstream of a pressure sensing switch in a water distribution system, which may include a water well and pressurized water tank. In a second embodiment, Applicant provides a similar valve on a pressure line downstream of a water softener. Fluid flow directly from the well pump, tank or other pressure source may be about 56° F. to 65° F., no matter the ambient temperatures. Purge valves in both embodiments are typically located in outside air, where they may be subject to contact with both the water in the system and the outside air. The valve contains a chamber having a material selected from materials which freeze between the temperatures of about 32° F. and 50° F., most preferably about 41.5° F. In doing so, the freezing working material contracts to allow a spring biased valve to open on a water pressure line, which valve then dumps or bypasses fluid from a high side (which may be well water pressure tank pressure) to a low side bypass, which may be ambient pressure. In doing so, pressure relief in the system at a temperature above the freezing point of water, generates fluid flow from the well and/or pressure tank or other source, thereby preventing freeze-up. In a preferred embodiment of Applicant's valve, there is a range of cross-sectional area ratios between water contacting elements of the valve and air contacting elements of the valve.

BRIEF DESCRIPTION OF THE DRAWINGS

FIG. 1A is a schematic illustration of details of the relationship between a mechanical purge valve and a pressure switch.

FIGS. 1B and 1C are illustrations of an electrical embodiment of Applicant's purge valve for use in close proximity to a pressure switch.

FIG. 4A is a cross-sectional detail view of the multi O-ring seal of FIG. 4 showing the lubricant used therewith.

FIG. 7A, warming a water source responsive to cool ambient temperatures; FIG. 7B, cooling a water source responsive to warm ambient temperatures; and FIG. 7C, valve closed condition, the valve not affecting the flow of water through the system.

FIG. 8 is a partially schematic view of a cattle trough water flow system that is adapted to use Applicant's novel valve in any of the embodiments illustrated.

FIG. 9 is a cross-sectional view of a valve showing a method of calibrating Applicant's mechanical valve so it opens and closes at the proper temperatures.

DETAILED DESCRIPTION OF THE PREFERRED EMBODIMENTS

Figure 1:
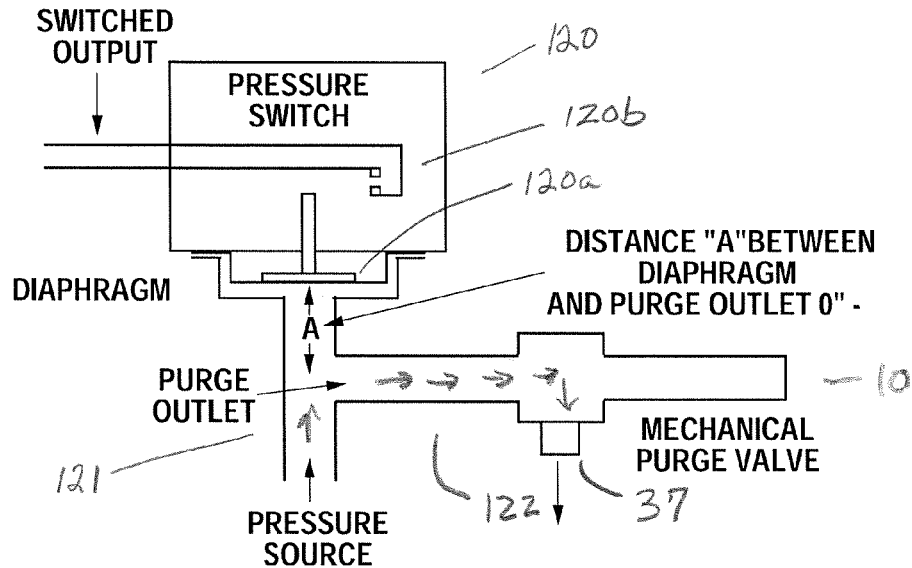
FIGS. 1 and 2 are schematic illustrations of Applicant's novel valve as used in a water well system and a water softener system.
Figure 1:
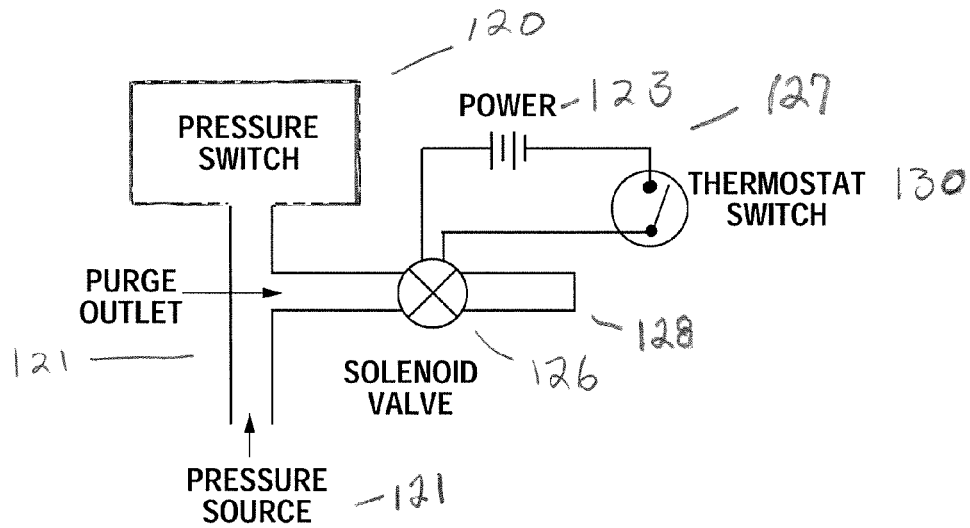
Figure 2:
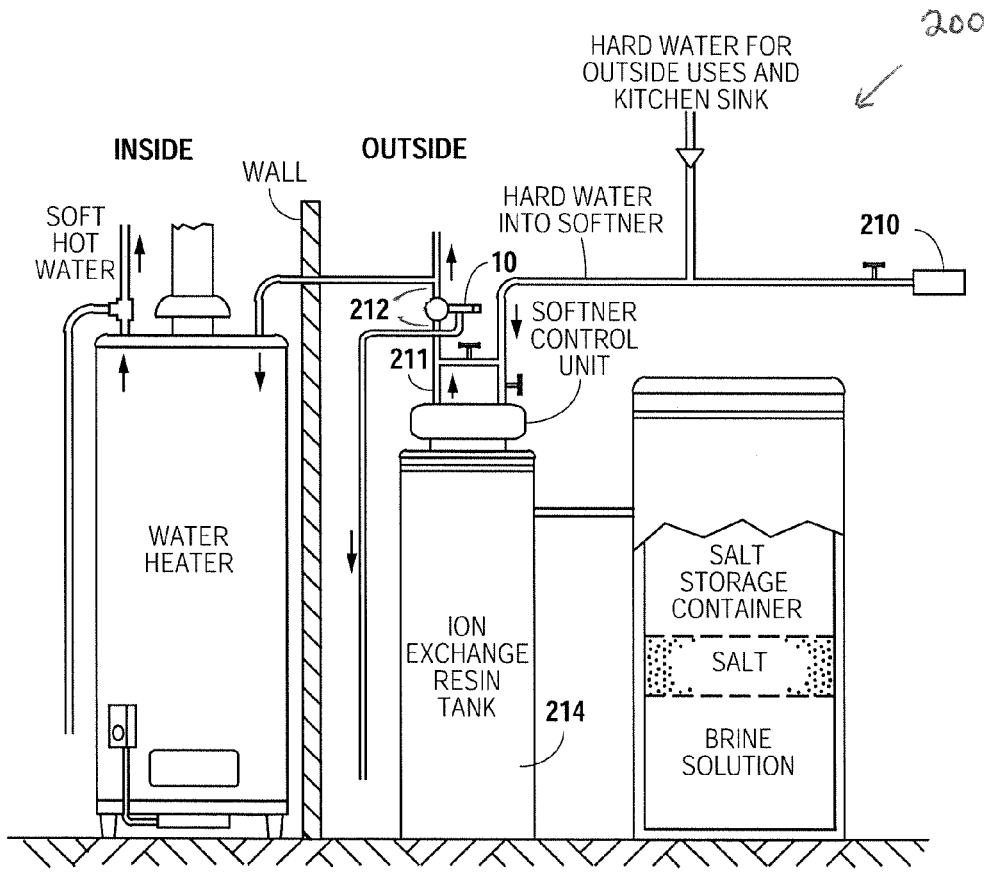
Figure 3:
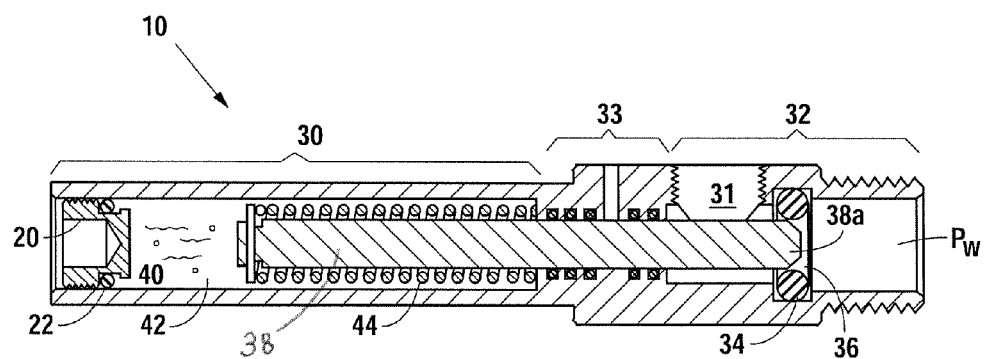
FIGS. 3 and 4 illustrate side cross-sectional views of an example embodiment of Applicant's novel valve in a closed and open position, respectively.
Figure 4:
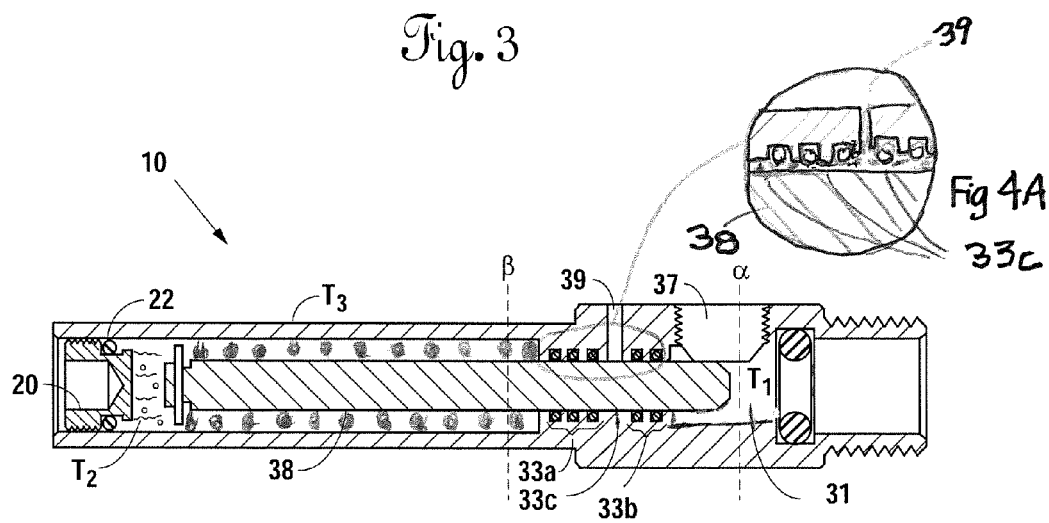

FIG. 1 illustrates Applicant's valve 10 as part of a water well assembly 100 and FIG. 2 illustrates Applicant's valve as part of a water softener assembly 200. FIGS. 3, 4, and 4A illustrate details of an example of valve 10 having a first body portion 30 and a second body portion 32, with a sealing area 33 therebetween, and a valve seat 34. A temperature/ pressure responsive piston 38 opens a bypass purge or port 36, and controls the flow of water through the bypass port 36 when the temperature drops below a set point, such as in the range of about 32° F. to 50° F., which set point is typically about 10° above the freezing point of water. Piston 38 is responsive to a change in volume (at phase change) of a working fluid 40, which working fluid fills a fluid chamber 42 in the first body portion 30 of the valve. When fluid 40 (which is typically not water based) in chamber 42 reaches a point, it will contract as it loses heat and changes phase from a liquid to a solid at the freezing point of the fluid, and will cause piston 38, biased open by the spring 44, to retract from seat 34. This allows water well and/or pressure tank pressurized water to flow through the bypass port 36 and out an outlet or purge port 37. Further details of Applicant's novel valve will be set forth after an explanation of its use in the system.

Turning to FIG. 1, it is seen that system 100 may include a water well 112, such as a domestic or commercial (municipal) water well, which may have a pump 114 (mechanical or electrical), such as submerged pump or any other pump suitably located to draw water from below the ground level of the well. A water supply line 115 provides the water under pressure through a pressure switch 120 control, to a pressurized water tank 116. Demand from users downstream of pressure tank 116 will allow water to flow out through line 118 to provide their needs. Pressure switch 120 is typically provided somewhere in the system (typically at, or upstream of tank 116), responsive to pressure changes in tank 116, such that below a low set pressure, pump 114 will be activated and provide water to tank 116, and above a high set pressure, will shut off.

FIG. 1 illustrates Applicant's well water well assembly 100 in various downstream water uses of the water from the water well assembly 100. These uses may include use in a commercial or residential structure 216, in a cooling tower, such as those known in the art for cooling the hot side of air conditioners 218, and a livestock animal trough 220, as set forth in more detail hereinbelow.

Pressure switch 120 may be of the diaphragm type and when exposed to temperatures near or below 32° F., especially when windy, can freeze up faster than any other part of the well assembly. They then become non-responsive to pressure changes in the system. When this occurs, a pressure drop in the pressure tank will not initiate a signal to start the pump, and the system has failed mechanically and is subject to further freezing and potential damage to equipment.

Use of Applicant's purge valve 10 in the system, typically at or upstream of tank 116 and typically close to the pressure switch, will help ensure that under even severe weather conditions, the purge valve, acting independently of the pressure switch, will help prevent freeze-up.

Applicant's water well assembly may have a pump which may be a mechanical water pump, such as a mechanical or a sucker rod pump or an electrical pump (or any other suitable pump). It may have a storage tank, which may be a pressurized storage tank, gravity feed storage tank or any suitable water storage tank for receiving water pumped from a domestic, commercial or agricultural water well. Typically, one or more water flow control devices are a part of the water well assembly to control the water pumped as it is used by downstream elements of the water well assembly.

FIG. 1A illustrates a schematic detail view showing the manner in which Applicant's purge valve may be used with a fluid pressure source pressurizing a pressure switch.

In FIG. 1A, a pressure switch 120 as known in the art, may include diaphragm 120a responsive to water pressure in pressure switch mount pipe 121, may engage one arm of electrical contacts 120b to close or open the contacts and energize/de-energize a remote pump responsive to water pressure in a pressure source and responsive in some embodiments to pressure in a pressure tank as set forth herein. A tee or horizontal member 122 may extend perpendicular to the typically vertical mount pipe 121. In any case, Applicant's valve 10 is typically located below the pressure switch 120 and in a manner that it may open and gravity drain, for example, through drain port 37, fluid from contact with the diaphragm. This will prevent freeze-up from damaging the diaphragm. It will also initiate a pump "on" condition by draining water in the tank. The pump will re-pressurize the system with, typically warmer water which, in turn, will help shut the mechanical purge valve. It will also initiate an "on" condition, by draining water from the pressure tank, which forces the pressure switch to turn the water well pump on, and refill the tank and piping with warmer water.

FIG. 1A illustrates that, in one embodiment, valve 10 is usually within a minimum distance (measured by fluid pathway) of about ¼ inch to about 12 inches from the diaphragm of the pressure switch. This will help protect and prevent freeze-up of the pressure switch.

Figure 1C:
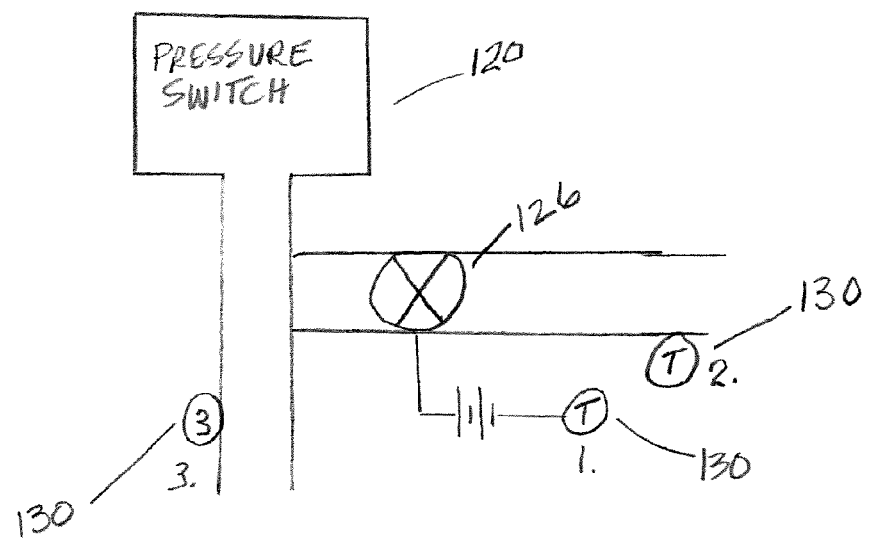

FIGS. 1B and 1C illustrate an alternate preferred embodiment of Applicant's system. Wherein the other systems set forth herein use a mechanical purge valve 10, it is noted that, in conjunction with a pressure switch, a solenoid valve 126 powered by a power circuit 127 may be used in close proximity to the pressure switch so that it may drain from a gravity fed outlet 128, water or other fluid at a pressure source 121. That is to say, instead of a mechanical valve 10, a solenoid valve 126 may operate with a circuit which includes power 123 (battery, DC, AC, solar or any suitable source) and a thermostat switch 130. Thermostat switch 130 will typically be set for the same approximate range as the mechanical purge valve, that is closing at least several degrees above freezing and opening solenoid valve 126 to allow fluid to drain before freeze-up at the pressure switch. As seen in FIG. 1C, thermostat switch 130 (or a sensor therefor) may be placed adjacent or on elements, metallic or non-metallic, downstream of solenoid valve 126. At position 2 or 3 as seen in FIG. 1C, when warmer water from a well, for example, flows through an open the solenoid valve, thermostat switch 130 may open causing the solenoid valve to close, thus re-pressurizing the pressure switch with, typically, warmer water. Position 1 locates switch 130 in air, while positions 2 and 3 are both water and air temperature exposures.

Further details of the valve may be appreciated with reference to FIG. 3. First portion 30 may be referred to as "air exposed" portion and contains an external surface, typically cylindrical and constructed of brass or other suitable metal, which also may be referred to as the air temperature sensing portion of valve 10. A second portion 32 has an interior that may be subject to the presence of stationary water (or empty) when the valve is closed and which carries water in an open or "protect" mode and is subject to the temperature bias of the purged water as it is discharged.

In a situation where the air temperature cools suddenly, for example, with the passage of a sudden cold front, first portion 30 will cool more quickly, subject as it is to exposure with the air, especially moving air, and second portion 32 will lag, subject to the water or proximity to system water and the contact with the water within (valve open) body portion 32 or proximate (valve closed) to body portion 32.

Water is known to moderate temperature changes (it has a much higher specific heat than the material, typically brass or other suitable metal, of which the valve body is made). Warm water within portion 32 will typically provide warmth to portion 32, which by conduction will provide some heat to portion 30 as it drops below the set point. Thus, portion 32 will have the effect of moderating air caused temperature changes of portion 30, so that especially with sudden changes of air temperature, sufficient heat may flow from portion 32 to 30 to moderate and prevent too quick a freeze-up of working fluid 40 (and thus a draining of water from the system).

FIGS. 3 and 4 illustrate valve 10 in a closed and open position irrespectively. Working fluid chamber 42 is sealed at a first end by removable threaded cap 20. Cap 20 may use an O-ring 22 on a shoulder thereof to tightly seal working fluid 40 in fluid chamber 42. Typically, the working fluid will be sealed into the chamber when in its liquid phase. The set point is calibrated by advancing the plug until the nose 38a of piston 38 is sealed in seat 34 which, in one embodiment, is an O-ring (see also FIG. 9). Spring 44 biases valve piston to the open position (see FIG. 4). However, fluid pressure of working fluid 40 in fluid chamber 42 holds the valve in the seated or closed position at temperatures above the set point. At these temperatures, the working fluid will expand slightly (compared to set point) to maintain a good seat, especially in an elastomeric seat, such as O-ring valve seat 34. However, as the air temperature cools through the set point, the working fluid will begin to undergo phase change and contract, thereby temperature proportionally opening valve as in FIG. 4. This will allow water to pass into the valve and out the port, utilizing the ambient pressure PW (see FIG. 3), which pressure is generated by the pressure tank and/or pump.

FIGS. 4 and 4A illustrate the use of an anti-seize lubricant 33c, which has a freezing point less than water. These lubricants may be used to fill in, around, and between the O-rings that separate the chamber containing the working fluid and the chamber through which purged fluid, typically water, will pass out of when the purge valve is opened. Tolerances between the piston and the body may be plus or minus 0.001 inch. It is seen the lubricant tends to be held in between the spaces that separate adjacent O-rings and the piston walls where they contact the body.

When the valve opens, water will be drawn through the channels of portion 32 and out the drain port to dump onto the ground, to recycle in the well (as illustrated in FIG. 1) or for other suitable disposal. This water will typically be warmer than air temperature and will warm the surrounding material of portion 32. Heat by conduction will flow to portion 30.

Working fluid 40, in certain embodiments, will undergo a phase change at about 41.5° F. (5.5° C.), which is approximately 10 degrees above the Fahrenheit freezing point for pure water. One such material is an alkane known as Tetradecane ($C_{14}H_{30}$), which undergoes a volumetric contraction of about 20% at the freezing/melting point (range 39-43° F.) as measured from a liquid phase to a solid phase. Preferably, working fluid 40 would undergo a phase change from liquid to solid contracting at the phase change, which freezing (melting) point is in the range of about 6° to about 18° F. above the freezing point of water in one embodiment.

Figure 2A:
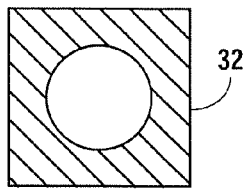
FIGS. 2A and 2B illustrate cross-sectional areas of a first, water contacting portion and a second, air contacting portion, respectively, of Applicant's novel valve.
Figure 2B:
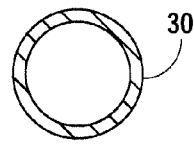

In some embodiments, cross-sectional area α of portion 32 is typically larger than cross-sectional area β of portion 30 (see FIGS. 2A and 2B). The metallic elements defining the body of the valve may, in particular embodiments, be brass (specific heat of approximately 0.1). The range of the larger area, that is, the cross-sectional area of portion 32 which contacts the water may be in the range of 1.2 to 4 times the cross-sectioned area of the air sensitive portion.

Figure 6:
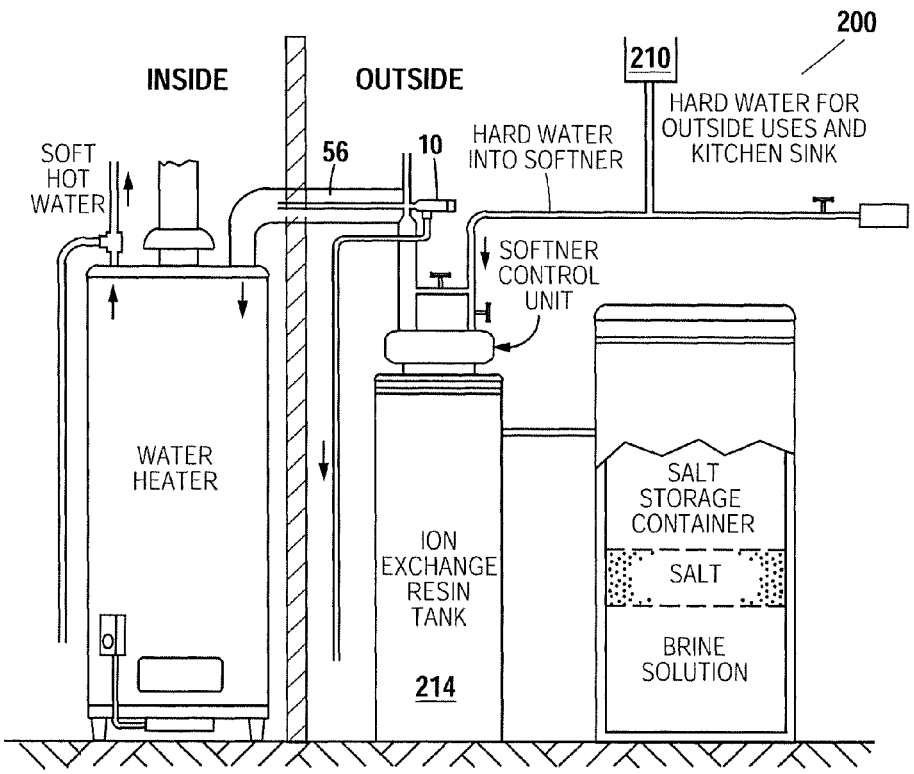
FIGS. 6 and 6A illustrate the use of a remote purge port for pipe downstream of the purge valve.
Figure 6A:
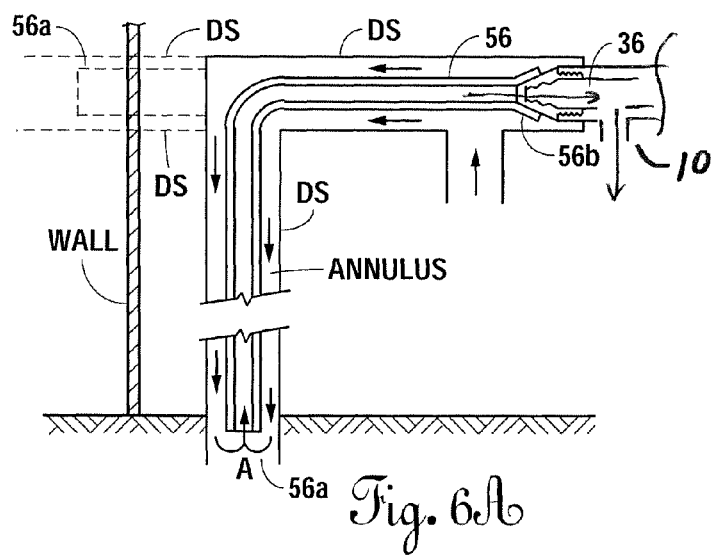

Turning to FIGS. 2, 6, and 6A, a water softener system 200 is illustrated, which has a water softener pressurized from a pressurized water source 210, which may be water well or water pressure tank or city water. FIGS. 6 and 6A illustrate Applicant's use of valve 10 on a water softener assembly 200 downstream of a water softener tank 214. Water from tank 214 is pressurized, valve 10 is typically exposed to ambient conditions. Pipes 212 downstream of resin tank 214, and other elements of the system may be exposed to cold air, as in a garage, shed or outside of a building. As such, they may benefit from use of Applicant's valve 10, which may be "teed" or otherwise installed into a water pressure bearing outlet, such as soft water outlet line 211, that is subject to cold temperatures. In the same fashion as set forth with the water well assembly 100, cold air temperatures will generate purging of the pressurized lines, which flow will maintain the circuit in a flow condition, for a period of time, to prevent freeze-up. The use of Applicant's valve is an alternative to leaving faucets on inside the house (so as to keep water flowing in system), which can waste water if ambient temperatures are above freezing and may let pipes freeze if the faucet discharge is less than what is needed for very cold temperatures. The use of Applicant's valve 10 in either assembly will reduce such water wastage, while preventing the assembly from freezing.

Figure 5:
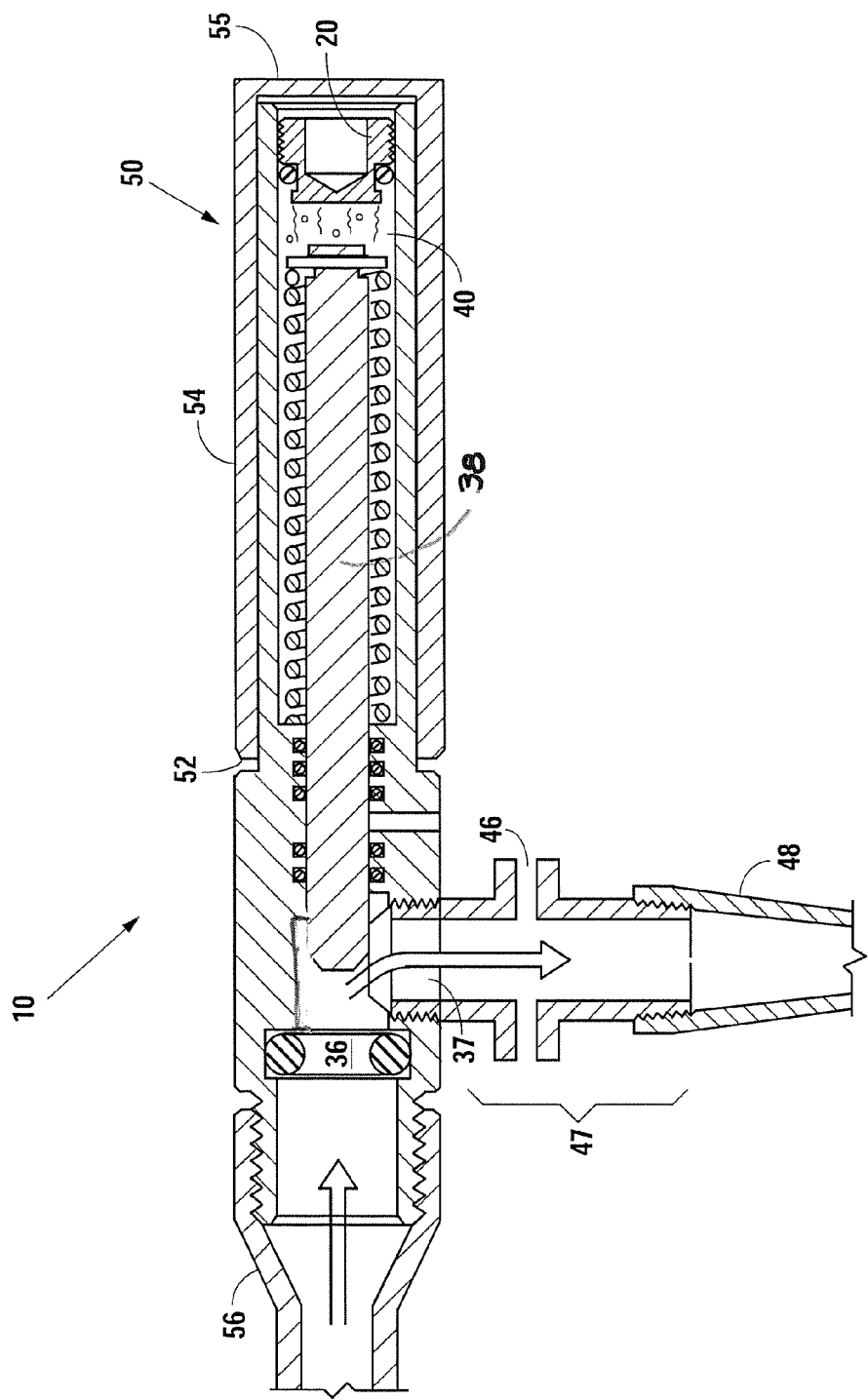
FIG. 5 is a side elevation cutaway of the purge valve (open).

FIG. 5 illustrates the use of a vacuum break 46 in a threaded drain fitting 47, which will help prevent siphoning when the removed end of drain tube 48 has water in it. Vacuum break 46 will also provide a water outlet, should any portions of drain line 48 freeze up. Drain tubes 48 are typically placed so that the removed end thereof is adjacent to a drain or goes back into the well.

FIG. 5 also illustrates the use of a sleeve or jacket 50, which is typically shaped with an open end 52 and a body 54, and a closed end 55, that will slip on and snugly engage the exterior portion 30 to act as a shield and insulation from the possibilities of wind, sleet, snow, ice and/or their accumulation, from affecting the air temperature sensitive portion of the device. Such an insulation jacket 50 may be made from 1/10 inch pliable plastic or suitable material typically with a thermal conductivity less than metal, or may be an air gap.

Working fluid 40 is sealed in fluid chamber 42 by cap 20 at one end and sealing area 33, such as multiple O-rings and grooves, which O-rings are urged against the outer wall of piston 38. One system of O-rings or other elastic material that has proved to be an effective seal to maintain the working fluid sealed in and to resist the pressure generated by expansion of the working fluid may be found in U.S. patent application Ser. No. 11/275,134, which is incorporated herein by reference.

The purge valve may be placed on a water well close to the pressure switch, approximately ¼" to 12" from the pressure switch in certain embodiments. The purge valve may be placed on or near the water softener control box or downstream of the water softener. In general, Applicant's novel purge valve may be used anywhere on any system where there is a need to prevent freeze-up of pipes.

Turning to FIGS. 3, 4, and 5, basically, the following summarizes some of the structure and functionality of the valve:

First body portion 30:
Cylindrical, typically metallic, defines an inner chamber
External surface exposed to ambient air; internal containing chamber 42 which contains the working fluid and removed end 38b of piston 38
Sealing plug or cap 20 for sealing working fluid and pressure calibration (typically screw)
Spring 44 to bias "open"
Optional jacket or sleeve (see FIG. 5) for exterior of metallic cylinder Second body portion 32:
May take any external or internal configuration within an internal water cavity/chamber 31
Chamber 31 bordered longitudinally with sealing area (see below), and bypass purge port 36, and also containing a vertical trending drain port 37
Metallic heat flow path between (among) $T_1$ of water in chamber 31, $T_2$ in cylinder (working fluid 40) first body portion 30, and $T_3$ (air) on exterior surface of second body portion 32 (see FIG. 4)

Sealing area 33, located longitudinally between body portions 30 and 32 (see FIG. 4)
Multiple seals adapted to withstand pressure in system
Seals on both sides of a leak vent 39 (prevent leakage) typically lubricant filled (prevents moisture and debris accumulation)
O-rings on working fluid side 33a prevent leakage of the working fluid
O-rings on water side 33b prevents leakage of water into the leak vent 39
Use of an anti-seize/lubricant compound 33c (FIG. 4A), on and around the O-rings is preferably food/drug grade FIG. 3 shows the valve in the closed position. However, the valve in the closed position may have the nose of the piston past the valve seat, that is to the right of the position of the nose with respect to the valve seat as seen in FIG. 3—such that in a closed position, the O-ring is on the cylindrical body portion of the piston. Regarding the valve seat, it may be an O-ring or other suitable elastomeric material. Regarding the O-rings or other sealing members of portion 33a of the sealing system, they are made of an elastomeric material that does not dissolve or react with the working fluid, but provides an effective fluid seal against the body of the piston. An anti-seize/lubricant compound 33c, such as a food grade silicon-based composition, may be used on and around the piston/O-ring interface. FIG. 4A illustrates the use of a low temperature (below the freezing point of water), anti-seize/lubricant compound 33c around and between the multiple O-rings that the piston moves over.

Turning to FIGS. 5, 6, and 6A, an optional purge port tube 56 may be provided to remotely locate a removed end 56a from a near end 56b. Near end 56b is engaged with a fluid tight couple close to bypass/purge port 36. When valve 10 is in a closed position, the water softener, well water or other pressure source is in a normal (non-freezing environmental) condition, with the purge valve and all elements thereof "invisible" to the system. However, when the air temperature gets cold outside and first portion 30 communicates a temperature drop by cooling the working fluid to freezing, the valve will then open and drain fluids out through drain port 37 and/or external drain tube 48. However, because of the use of purge port tube 56 placed in an annulus of pipe DS downstream of valve 10, the purged fluid is being drawn from the remote removed end 56a and, therefore, flows all the way through the annulus between the tube 56 and the inner walls of the DS pipe purging it of cooling water and generating flow, with warmer fluid coming in and preventing freeze-up. Note that removed end 56a is typically located past where the pipe annulus enters the interior environment, whether that be just below ground or just inside a wall (see ghosted lines, FIG. 6A). In either case, the effect of using purge port tube 56 with removed end 56a located in a warmer non-ambient, non-outside air temperature environment is to maintain flow through all of the pipe annulus, even portions downstream of the purge port. Arrows at A in FIG. 6A show flow of water when the valve gets cold and opens (piston and seat omitted).

Figure 7A:
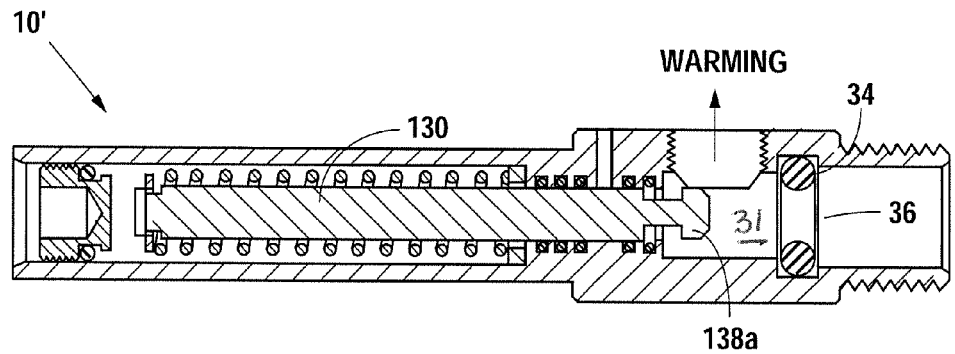
FIGS. 7A, 7B, and 7C provide cross-sectional cutaway views of another example embodiment of Applicant's present mechanical purge valve in three conditions.
Figure 7B:
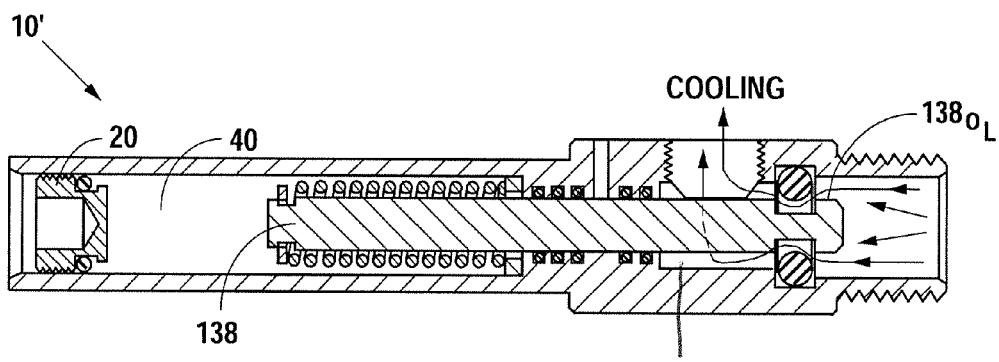
Figure 7C:
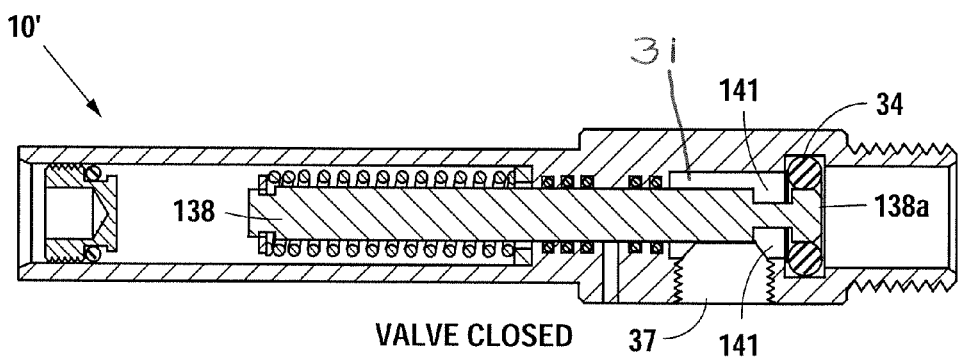

FIGS. 7A, 7B, and 7C illustrate an alternate embodiment 10' of Applicant's valve. Structurally, the difference in the previous embodiment (see, for example, FIGS. 3 and 4) lies in the structure of piston 138. In the alternate embodiment 10' of the valve, piston 138 is seen to have a nose 138a, which has an annular recess 141. The annular recess is dimensioned such that in a "valve warm" condition (FIG. 7B), wherein expansion of the working fluid 40 in chamber 42 has, through expansion responsive to the warm air/ambient water temperatures, pushed the tip of nose 138a past O-ring or valve seat 34, so that annular recess 141 is adjacent to the seat. This is the condition seen in FIG. 7B and it may be seen that cool fluid (relative to air temperature) may pass through the space created by the annular recess and out drain port 37 to provide water from the well or storage, which will typically be cooler, to elements downstream of drain port 37. In this manner, Applicant's alternate embodiment 10' acts to provide cool fluid, that is, cooler than air/ambient water temperature, to elements downstream of the valve. Embodiment 10' will also prevent freeze-up (see FIG. 7A) in the manner of valve 10.

Applicant has found that, in the summer, livestock, while thirsty and in need of water, are reluctant to drink water from a trough when the water in the trough is too warm. What Applicant provides therefor in an alternate embodiment 10' of the valve is the ability of the valve piston to "overshoot" the seat and place the annular recess 141 adjacent the seat and allow cooler water from tank 304 to flow into trough 306. Water in the tank or container 304 is typically cooler in the summer than the surrounding air temperature and the water temperature in the trough, and warmer in the winter than the surrounding air temperature and temperature of the trough, containing as it is, a large warm water received from the ground.

FIG. 8 illustrates a use of Applicant's alternate embodiment 10' in a livestock watering system 300. Livestock watering systems are used to provide water for livestock in pastures and feedlots and may comprise a water pump 302 engaging a water well 303. Water pump 302 may be a windmill using a mechanical pump as well known in the art of windmill water pumping. Pump 302 may also be electrical. As illustrated in FIG. 8, pump 302 may pump water from well 303 into an elevated tank or other water storage vessel 304 (pressurized or gravity feed) for selectively supplying water to a nearby trough 306. A conduit 308 is typically provided with Applicant's valve, in either embodiment, but in the embodiment illustrated 10' at the removed end of conduit 308 and typically beneath water level WL of trough 306. In some cases, a parallel water feed system 310 may be provided to bring water to trough 306 responsive to water level or float valve 312. Such float valve 312 controlled water level systems are well known in the art. Applicant's system provides water to trough 306 separate from and not controlled by the float valve system, if one is present.

As is seen in FIG. 8, first body portion 30 and, in fact, the entire valve 10 or 10' may be submerged below typical water levels in the trough. However, the valve might be in air positioned so it drains water into the trough when opened. As seen in FIGS. 7A-7C, Applicant's valve 10' is adapted to provide water that is cooler or warmer than a preselected water temperature range. Typically, the water in the trough has a greater surface area exposed to cold or warm air temperatures than the larger volume of water in storage tank 304 and thus will reach a cooler or warmer temperature sooner than the storage tank in the same air temperature, humidity, and wind conditions. Thus, the valve open condition of FIG. 7A, which typically occurs at temperatures up to about 18° F. above the freezing point of water, will open and allow relatively warmer water from the tank 304 to enter the trough to prevent ice buildup when the air temperature is cool. When the air gets warm, it can warm the trough water and a condition as seen in FIG. 7B can result. This will allow cooler water to flow into the trough.

FIG. 9 illustrates a threadably removable cap 20 adapted to engage the removed end of second body portion 32, so as to seal fluid chamber 42. Cap 20 may have a recessed tool receiving section 20a on an exterior surface thereof, and an annular recess 23 on the near end thereof for holding an O-ring 22 (see also FIG. 3).

FIG. 9 also illustrates a method of calibrating the piston so that it seats and unseats at the proper temperatures. In this method, the valve housing is held vertically in a fixed position and the working material, fluid at room temperature, is used to fill fluid chamber 42. At this point, the spring will have the piston fully retracted (see FIG. 4). In this method, the valve housing is typically held vertically in a fixed position and the working, fluid at room temperature, is used to fill the fluid chamber 42. At this point, the spring will have the piston fully retracted from the seat (see FIG. 4, for example). The spring is not under compression, the cap is off, and the fluid chamber is fully filled. The cap (which may be self-tapping) is then threaded in with tool 31 until the O-ring 22 contacts the inner walls of the fluid chamber. Further rotation of the cap compresses the working fluid, then moves nose 38 until it is against a dial indicator gauge 315 and/or limit switch. The dial indicator gauge/limit switch actuates to turn off the rotary tool when the nose, at room temperature, has moved to the preselected position past the seat as indicated in FIG. 9. Further warming will simply move the nose slightly further down, as seen in FIG. 9, but the dial indicator gauge and/or limit switch 315 has properly positioned the nose with respect to the seat, such that the valve will unseat when the first set temperature, typically the freezing point or freezing range of the working material, is reached, opening the valve as seen in FIG. 4 or 7A.

The combination of a pressure switch with Applicant's mechanical or electrical purge valve in close proximity thereto, may be used in any suitable environment where the pressure switch may be exposed to ambient freezing conditions. Exemplary of these environments are the following: water wells, reverse osmosis systems, ice machines, water level controls (depth gauges and large tanks), aerobic septic systems, lawn sprinkler systems, fire sprinkler systems, geothermal AC systems, cooling tower AC systems, and gray water distribution systems. While the 0 to about 12 inches is measured typically from the diaphragm surface along the water path to the inlet of valve 10 or solenoid 126, other distances may be suitable, including preferably between about 2 to about 8 inches.

Although the invention has been described with reference to specific embodiments, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A water distribution system, the system comprising:
   a thermally actuated valve comprising a housing having walls defining an inlet adapted to receive water under pressure, an outlet, a first chamber fluidly connecting the inlet to the outlet, a second longitudinal chamber having a near end and a removed end, walls defining a bore separating the first chamber from the second longitudinal chamber;
   a resilient seat defining a seat plane, the seat for engaging the housing, the seat adjacent the inlet of the first chamber of the housing;
   a thermally conductive piston having a first end that includes a nose and a second end and a longitudinal axis, the piston partially disposed in the first chamber, slidably disposed in the bore, and partially in the second chamber, the piston's longitudinal axis aligned substantially perpendicular to the seat plane;
   a spring for engaging the second chamber at the near end and the second end of the piston, so as to bias the piston towards the removed end of the second chamber;
   a fluid seal for sealing between the piston and the bore;
   a working material sealed in the second longitudinal chamber, a working fluid selected such that it expands when warmed and contracts when cooled and has a freezing point above the freezing point of water;
      wherein the housing, piston, spring, and seat are dimensioned and located such that at a first temperature above about 32° F., the working fluid will seat the nose against the seat preventing fluid from flowing through the first chamber, and at temperatures above the first temperature will move the nose past the seat against the spring bias, and at temperature below the first temperature will move the nose responsive to the spring bias to an unseated position, allowing fluid flow between the inlet and the outlet; and
   a water supply system fluidly coupled to the valve;
      wherein the water supply system includes a water well with a pump, the water well and pump upstream of the thermally actuated valve; and
      wherein the water supply system contains a pressure switch and the thermally actuated valve is within about 12" of the pressure switch.

2. The distribution system of claim 1, wherein the water supply system includes a water storage container for receiving water from the pump, a livestock watering conduit for carrying water from the water storage container to a trough, the valve being located such that a removed end of the livestock watering conduit engages the valve at the housing inlet and positions the valve below a water level of the livestock watering trough.

3. The distribution system of claim 1, wherein the thermally actuated valve is located upstream of the pressurized water holding tank and proximate the pressure switch.

4. The distribution system of claim 1, further including a water heater.

5. The distribution system of claim 1, wherein the thermally conductive piston also includes a recess portion.

6. The distribution system of claim 1, wherein the housing of the thermally actuated valve has exposed exterior walls and interior walls.

7. The distribution system of claim 1, wherein the first chamber and the second longitudinal chamber have walls, wherein a cross-sectional area of the walls of the first chamber are greater than a cross-sectional area of the walls of the second chamber.

8. The distribution of claim 1, wherein the working material is selected from a material that undergoes a phase change from liquid to solid between about 6° to about 18° F. above the freezing point of water, which liquid to solid phase change includes substantial contraction of the volume of material.

9. The distribution system of claim 1, further including a vacuum break downstream of the outlet of the housing.

10. The distribution system of claim 1, further including a conduit having a near and a removed end for fluidly engaging the inlet, the conduit extending away from the housing so as to locate the removed end away from the housing, such that fluid entering the inlet is drawn from the removed end of the conduit.

11. The distribution system of claim 1, wherein the second longitudinal chamber of the housing includes a receiving opening for receiving the working material at the removed end of the second longitudinal chamber for receipt of the working material into the second chamber and further including a cap for fluidly sealing the working material in the second chamber.

12. The distribution system of claim 1, further including a drain tube for engaging the outlet of the first chamber of the housing.

13. The distribution system of claim 1, further including a jacket configured to engage exterior wall surfaces of the second longitudinal chamber.

14. The distribution system of claim 1, wherein the water supply system includes a water softener.

15. The distribution system of claim 14, wherein the thermally actuated valve is located downstream of the water softener.

16. The distribution system of claim 1, wherein the working material is an alkane.

17. The distribution system of claim 16, wherein the alkane is tetradecane.

18. The distribution system of claim 1, wherein the housing includes a leak vent in fluid communication with the bore.

19. The distribution of claim 18, further including an O-ring on a first side of the leak vent and an O-ring on a second side of the leak vent.

* * * * *